United States Patent
Itoh et al.

(10) Patent No.: US 12,522,445 B2
(45) Date of Patent: Jan. 13, 2026

(54) CONVEYOR DEVICE AND SENSOR FOR CONVEYOR

(71) Applicant: ITOH DENKI CO., LTD., Kasai (JP)

(72) Inventors: Kazuo Itoh, Kasai (JP); Toshiyuki Tachibana, Kasai (JP); Kenji Inaya, Kasai (JP); Tomoya Matoba, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 96 days.

(21) Appl. No.: 18/575,053

(22) PCT Filed: Jun. 28, 2022

(86) PCT No.: PCT/JP2022/025681
§ 371 (c)(1),
(2) Date: Dec. 28, 2023

(87) PCT Pub. No.: WO2023/276992
PCT Pub. Date: Jan. 5, 2023

(65) Prior Publication Data
US 2025/0091815 A1    Mar. 20, 2025

(30) Foreign Application Priority Data
Jun. 29, 2021 (JP) ................. 2021-107289

(51) Int. Cl.
*B65G 47/244* (2006.01)
*B65G 43/08* (2006.01)
*B65G 47/76* (2006.01)

(52) U.S. Cl.
CPC .......... *B65G 47/244* (2013.01); *B65G 43/08* (2013.01); *B65G 47/766* (2013.01); *B65G 2203/0225* (2013.01)

(58) Field of Classification Search
CPC .... B65G 47/766; B65G 43/08; B65G 47/244; B65G 2203/042; B65G 2203/044
(Continued)

(56) References Cited

U.S. PATENT DOCUMENTS 4,228,886 A * 10/1980 Moran ................. G01B 11/002
271/84
2001/0020566 A1    9/2001 Kalm et al.
(Continued)

FOREIGN PATENT DOCUMENTS

EP    2 441 706 A1    4/2012
JP    2009-521380 A    6/2009
(Continued)

OTHER PUBLICATIONS

International Search Report mailed Aug. 2, 2022, in International Appln. No. PCT/JP2022/025681.
(Continued)

*Primary Examiner* — James R Bidwell
(74) *Attorney, Agent, or Firm* — Wood, Phillips, Katz, Clark & Mortimer

(57) ABSTRACT

The present invention provides a conveyor device and a conveyor sensor capable of detecting various types of information on an object. The conveyor device that conveys the object to a predetermined conveyance place includes a conveyor sensor that detects the information of the object. The conveyor sensor includes a plurality of sensor members, and the plurality of sensor members can individually detect the presence of the object and is arranged side by side in a direction intersecting the conveying direction of the object.

8 Claims, 7 Drawing Sheets

(58) Field of Classification Search
USPC .................................. 198/370.01, 395, 401
See application file for complete search history.

(56) References Cited

U.S. PATENT DOCUMENTS

| | | |
|---|---|---|
| 2004/0104100 A1 | 6/2004 | Schiesser et al. |
| 2008/0302634 A1 | 12/2008 | Costanzo et al. |
| 2012/0090961 A1 | 4/2012 | De Martin |
| 2015/0210484 A1* | 7/2015 | Itoh .................... B65G 47/54 |
| | | 198/370.01 |
| 2017/0101273 A1 | 4/2017 | Itoh et al. |

FOREIGN PATENT DOCUMENTS

| | | |
|---|---|---|
| JP | 2013-199359 A | 10/2013 |
| JP | 2013-256381 A | 12/2013 |
| JP | 2017-171430 A | 9/2017 |
| JP | 2020-189754 A | 11/2020 |
| JP | 6804853 B2 | 12/2020 |
| JP | 2021-070537 A | 5/2021 |
| WO | 2007/108852 A2 | 9/2007 |

OTHER PUBLICATIONS

Supplementary European Search Report issued Apr. 16, 2025, in European Application No. EP 22 83 3139.
International Preliminary Report on Patentability and Written Opinion from the International Searching Authority, dated Dec. 14, 2023, for International Application No. PCT/JP2022/025681.

* cited by examiner

CONVEYOR DEVICE AND SENSOR FOR CONVEYOR

FIELD OF THE INVENTION

The present invention relates to a conveyor device. In addition, the present invention also relates to a conveyor sensor used in a conveyor device.

BACKGROUND ART

A conveyor device that convey goods (objects) to a target place is widely used in delivery places, pickup places, warehouses, and the like. As such a conveyor device, for example, there is one disclosed in Patent Document 1. The conveyor device disclosed in Patent Document 1 is a conveyor device capable of conveying an object to any of a plurality of destination places.

The conveyor device includes a linear conveying zone that linearly conveys the object and a conveying direction changing zone that selects a conveying direction of the object and sends out the object to the direction. Furthermore, the linear conveying zone is constituted by a zone conveyor, and the conveying direction changing zone is constituted by a transfer device.

The zone conveyor is a roller conveyor, and includes a pair of side frames and a plurality of conveying rollers supported by the side frames. In addition, the zone conveyor has a load presence sensor at a position on upper sides of the side frames and near a downstream end.

Specifically, the load presence sensor of Patent Document 1 is a device that detects whether the object exists near the downstream end of the zone conveyor where the sensor is installed. In other words, the load presence sensor detects presence or absence of the object at the installation place in a non-contact manner.

In addition, Patent Document 2 discloses a conveyor device employing a reflective photoelectric sensor as such a load presence sensor.

Patent Document 1: JP 2020-189754 A
Patent Document 2: JP 2013-199359 A

The above-described conventional load presence sensor detects the presence or absence of the object, and cannot detect information such as posture inclination of the object during conveyance and deviation of conveyance position. In other words, the conventional conveyor device has room for improvement in terms of detecting various types of information of the object without providing a high-priced and large-scale sensor or the like.

In addition, the above-described conventional load presence sensor needs to secure the installation place on the side frames. Here, another member such as a guide member that prevents the object from falling off may be attached on the side frames. In addition, when operating the conveyor device, a person may stand by and perform some work. Based on these facts, it is preferable that a wide space is secured around the conveyor device including over the side frames. In other words, the conventional load presence sensor has room for improvement from a viewpoint of securing a wide space around the conveyor device including the upper of side frames.

In addition, in a case where the reflective photoelectric sensor is adopted as the load presence sensor, there may also be a problem that it is difficult to adjust an optical axis when the photoelectric sensor is attached onto the side frames. In other words, a conventional load presence sensor has room for improvement from a viewpoint of facilitating attachment work.

SUMMARY OF THE INVENTION

Therefore, an object of the present invention is to provide a conveyor device and a conveyor sensor capable of detecting various types of information regarding an object with an inexpensive and simple structure.

One aspect of the present invention for solving the above problems is a conveyor device that conveys an object to a predetermined conveyance place, including a conveyor sensor that detects information of the object, the conveyor sensor including a plurality of sensor members each capable of individually detecting presence of the object and lined up in a direction intersecting a conveying direction of the object.

According to this aspect, it is possible to detect various types of information such as information regarding the posture of the object and information regarding the conveyance position of the object with an inexpensive and simple structure.

It is preferable that the above-described aspect further includes a first conveyance device that forms at least a part of a conveyance path of the object, wherein the first conveyance device places the object on a conveyance surface to convey the object, and wherein the conveyor sensor is attached below the conveyance surface of the first conveyance device.

According to this aspect, a wide space can be secured around the conveyor device, that is, on the side or above the conveyance surface, which is preferable.

It is preferable that, the above-described aspect further includes a first conveyance device that forms at least a part of a conveyance path of the object, wherein the first conveyance device includes a plurality of driving bodies arranged at an interval, the plurality of driving bodies placing the object on a conveyance surface over the driving bodies to convey the object, wherein the driving bodies includes a first and a second driving bodies, the first and the second driving bodies being adjacent to each other, and wherein the plurality of sensor members of the conveyor sensor are lined up between the first driving body and the second driving body.

Even in such an aspect, a wide space can be secured around the conveyor device.

In addition, since the conveyor sensor is arranged in an empty space formed in the conveyor device, it is not necessary to newly secure the installation place for installing the conveyor sensor, which is preferable.

In the above-described aspect, it is preferable that the conveyor sensor executes a first detection operation of detecting one or more pieces of information selected from the group consisting of information on a posture of the object during conveyance and information on a conveyance position, and one or more selected from the group consisting of a posture during conveyance and a conveying position are changed based on a result of the first detection operation.

According to this aspect, the object can be conveyed in a preferable posture or a preferable conveyance position.

In the above-described aspect, it is preferable that the conveyor sensor executes a second detection operation of detecting information on dimensions of the object.

In the above-described preferable aspect, it is further preferable that an extension member is provided above a side of the conveyance surface, and when changing the posture of the object during conveyance, the object is conveyed toward the extension member, and the posture of the object is changed by pressing the object against the extension member.

Another aspect of the present invention is a conveyor sensor that is attached to a conveyor device conveying an object to a predetermined conveyance place and that detects information of the object, including: a plurality of sensor members each capable of individually detecting presence of the object; and an extension portion, wherein the plurality of sensor members are arranged on the extension portion and are lined up in a longitudinal direction of the extension portion.

Also in this aspect, it is possible to detect various types of information such as the information regarding the posture of the object and information regarding the conveyance position of the object with an inexpensive and simple structure.

According to the present invention, it is possible to provide a conveyor device and a conveyor sensor capable of detecting various types of information regarding an object with an inexpensive and simple structure.

BRIEF DESCRIPTION OF THE DRAWINGS

FIGS. 1A and 1B are views illustrating a conveyor device according to an embodiment of the present invention, in which FIG. 1A is a perspective view and FIG. 1B is a plan view.

FIGS. 3A and 3B are views illustrating a state in which a posture of the object is detected by the conveyor device of FIG. 1, in which FIG. 3A is a view illustrating a state in which the object is conveyed in an assumed posture, and FIG. 3B is a view illustrating a state in which the object is conveyed in a posture different from an assumed posture. Additionally, in each of FIG. 3A and FIG. 3B, the left drawing is a plan view illustrating a state in which the object is conveyed by the conveyor device, and the right drawing is an explanatory view illustrating a state in which the object passes over the sensor unit.

FIGS. 4A and 4B are views illustrating a state in which a conveying position of an object is detected by the conveyor device of FIG. 1, in which FIG. 4A illustrates a state in which the object is conveyed at a position closer to one conveyor frame, and FIG. 4B illustrates a state in which the object is conveyed at a position closer to the other conveyor frame. Additionally, in each of FIG. 4A and FIG. 4B, the left drawing is a plan view illustrating a state in which the object is conveyed by the conveyor device, and the right drawing is an explanatory view illustrating a state in which the object passes over the sensor unit.

DETAILED DESCRIPTION OF THE PREFERRED EMBODIMENTS

Hereinafter, a conveyor device according to an embodiment of the present invention will be described in detail with reference to the drawings, but the present invention is not limited to these examples.

Figure 1A:
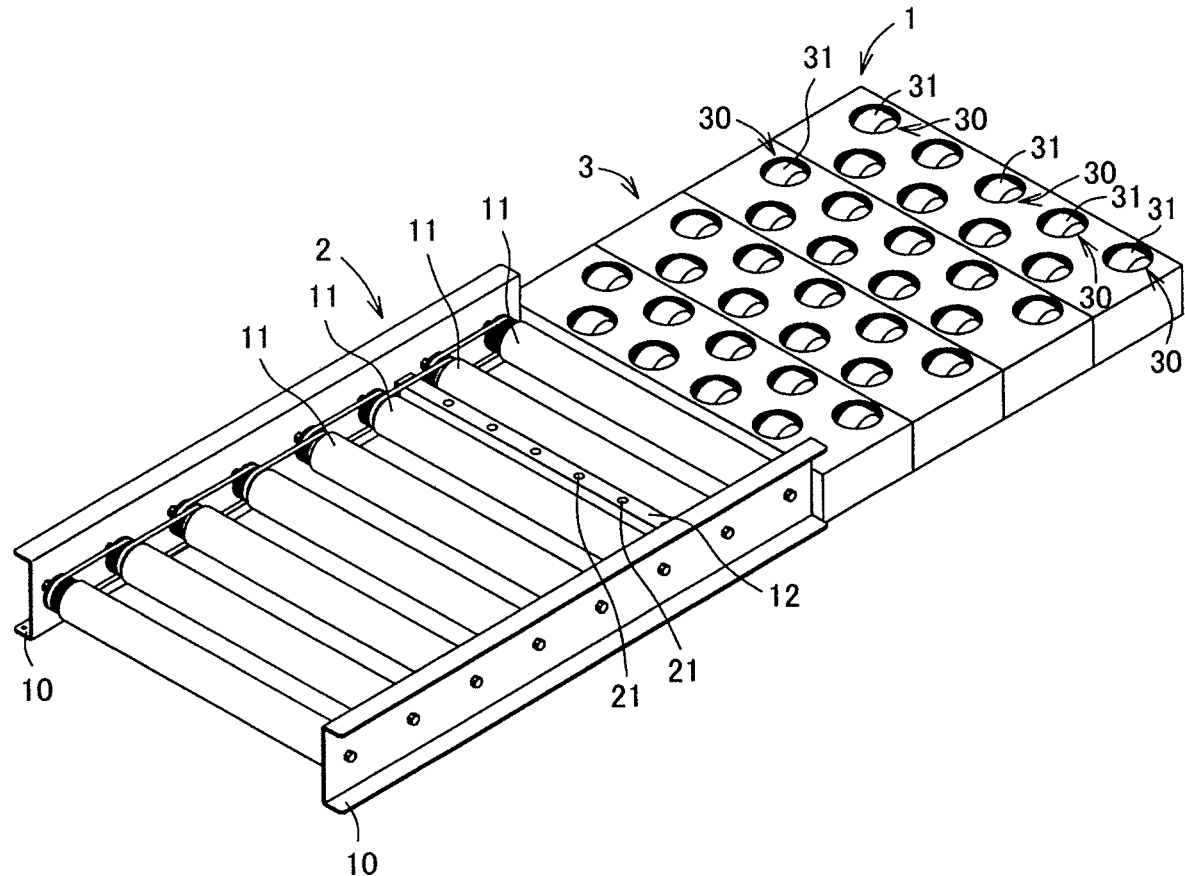

As illustrated in FIG. 1, a conveyor device 1 of the present embodiment includes two conveyance devices including a first conveyance device 2 and a second conveyance device 3.

In the conveyor device 1, the conveyance path of the object is divided into a plurality of regions (zones). Furthermore, the first conveyance device 2 is located on an upstream side in the conveying direction, and the second conveyance device 3 is adjacent to a downstream side in the conveying direction.

The first conveyance device 2 forms a region for linearly conveying the object.

The second conveyance device 3 forms a region in which the object is conveyed in one of a plurality of directions (one direction selected from the plurality of directions). This region is, for example, a region in which it is possible to select conveyance to be performed straight and conveyance to be performed to change the direction. In other words, it can be said that the region is a region in which the conveying direction branches into a plurality of directions.

In addition, the conveyor device 1 includes a control device (not illustrated). This control device may be constructed by, for example, an external computer or a zone controller provided in each area. In the conveyor device 1 of the present embodiment, various operations are controlled by this control device. In other words, as will be described in detail later, the control device controls the detection operation by a sensor unit 12, a determination operation based on the result of the detection operation, and the operation executed by the conveyance device based on a result of the determination operation. In addition, the control device executes an operation (calculation) of calculating the dimensions or the like based on the result of the detection operation.

The first conveyance device 2 is a so-called roller conveyor, and includes a pair of conveyor frames 10 extending in parallel to each other, a plurality of conveying rollers 11 (driving bodies), and the sensor unit 12 (the conveyor sensor). Additionally, for convenience of drawing, only a part of a conveying roller 11 is denoted by a reference numeral, and other reference numerals are omitted. In addition, similarly, only some of the other members are denoted by the reference numerals as necessary, and the other reference numerals are omitted.

Each of the plurality of conveying rollers 11 is rotatably supported by two conveyor frames 10, and is arranged in parallel at a predetermined interval in the conveying direction of the object.

Here, at least one of the plurality of conveying rollers 11 is a driving roller, and the others are follower rollers. Furthermore, the two conveying rollers 11 adjacent to each other in a parallel direction are connected via a belt member, and the other conveying roller 11 rotates with the rotation of the one conveying roller 11. Therefore, a rotational driving force of the driving roller is transmitted to the other follower rollers via the belt member, and each follower roller is driven to rotate with respect to the driving roller.

Additionally, the driving roller may be a motor-incorporating roller incorporating a motor serving as a driving source. In addition, the driving roller may be a roller that is connected to an external motor (not illustrated) serving as a driving source by a belt and rotates by receiving power from the external motor.

In the first conveyance device 2, the conveyance surface is formed by upper portions of the plurality of conveying rollers 11. Additionally, the "conveyance surface" is a portion on which the object is placed when the object is conveyed by the first conveyance device 2. More specifically, it is a virtual plane formed at the same height as the portion where the object is placed, and is a plane extending in a horizontal direction. In the first conveyance device 2 of the present embodiment, the conveyance surface is formed between the two conveyor frames 10 at a position below upper ends of the conveyor frames 10.

Figure 2:
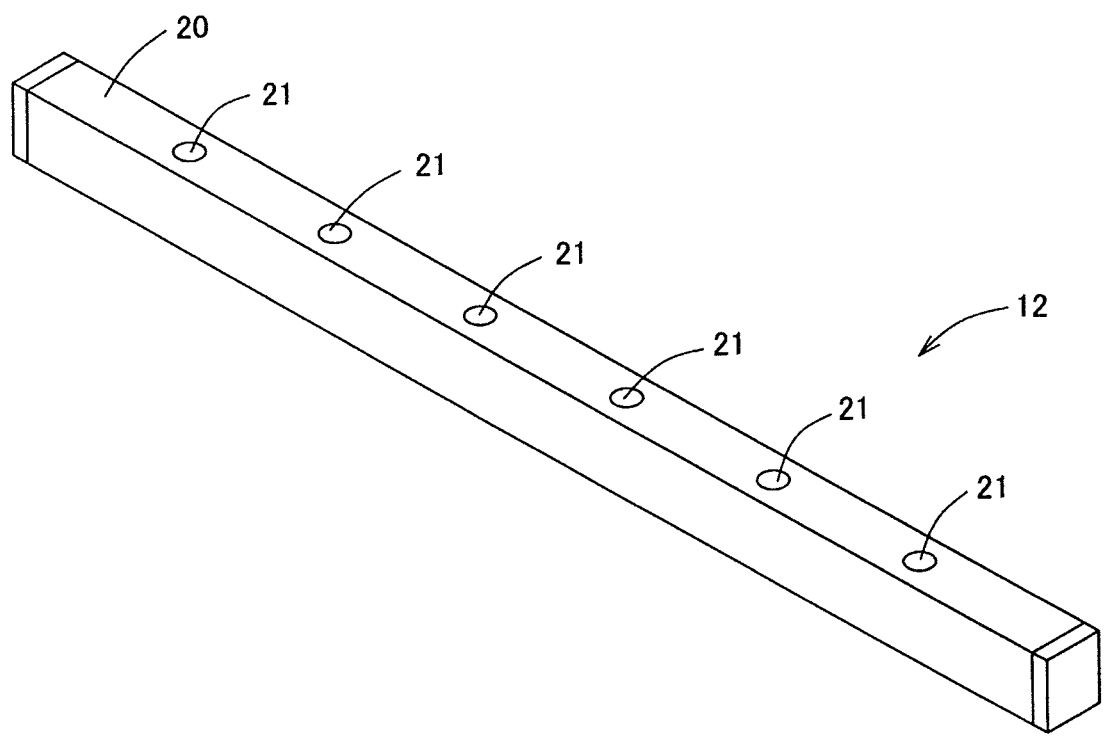
FIG. 2 is a perspective view illustrating a sensor unit illustrated in FIG. 1A.

As illustrated in FIG. 2, the sensor unit 12 includes an outer member 20 and a plurality of sensor members 21. In the sensor unit 12, the plurality of sensor members 21 is fixed to the outer member 20 and integrated (unitized). The sensor unit 12 of the present embodiment has an overall outer shape extending in a rod shape. In other words, the entire sensor unit 12 can be said to be a portion (the extension portion) extending linearly or substantially linearly.

In the sensor unit 12, a plurality of (six) sensor members 21 is linearly arranged in parallel at intervals to form a sensor array. At this time, the parallel direction of the sensor members 21 is the same as the longitudinal direction of the sensor unit 12. Additionally, in the present embodiment, the plurality of sensor members 21 is arranged at equal intervals, and are not particularly limited, but are arranged at equal intervals at a pitch of 100 mm.

The sensor member 21 is a sensor capable of detecting the presence of an object, and in the present embodiment, the reflective photoelectric sensor is adopted. In other words, the sensor member 21 includes a light projecting unit and a light receiving unit, and detects that a detection target exists at a predetermined place by the light projected from the light projecting unit being reflected by the object to be detected and reaching the light receiving unit. In other words, the sensor member 21 executes a detection operation of detecting the presence or absence of a detection target in a predetermined place in a non-contact manner.

Additionally, although not particularly limited, in the present embodiment, a photodiode is adopted as the sensor element constituting the light receiving unit.

The sensor member 21 generates a signal indicating a result of the detection operation (hereinafter, it is also simply referred to as a detection result), that is, a signal indicating whether or not an object is present. In the sensor unit 12 of the present embodiment, each of a plurality of (six in the present embodiment) sensor members 21 individually executes a detection operation and individually generates a sensor signal. Furthermore, the sensor unit 12 converts the plurality of (six) sensor signals into serial signals and transmits the serial signals to the above-described control device. Therefore, the control device can individually acquire sensor information of the plurality of sensor members 21 belonging to the sensor unit 12, that is, information regarding the detection result of each sensor member 21.

Here, the sensor unit 12 is attached to the conveyance device (two conveyor frames 10) such that a light projection direction of each sensor member 21 is directed upward. In the sensor unit 12 of the present embodiment, the plurality of sensor members 21 is arranged such that the light projection directions of the sensor members 21 are the same direction.

In the sensor unit 12 of the present embodiment, a bottom surface of the object over which each sensor member 21 passes is set as the detection target, and specifically, it is detected whether or not a part of the bottom surface of the object exists at a position vertically above an installation position and on the conveyance surface.

As illustrated in FIG. 1 and the like, the sensor unit 12 has one end side in the longitudinal direction fixed to one of the pair of conveyor frames 10 and the other side fixed to the other of the conveyor frames 10. As described above, the sensor unit 12 is formed by unitizing the plurality of sensor members 21, and attachment work is easy.

Thus, the sensor unit 12 is arranged in a space positioned between the two conveyor frames 10, and extends from one end to the other end in a width direction of the space.

Additionally, the width direction here is a width direction of the first conveyance device 2 (a direction orthogonal to the conveying direction in the plan view), and is also the parallel direction of the two conveyor frames 10.

In other words, when attached to the first conveyance device 2, the sensor unit 12 extends in a direction crossing the conveying direction. Therefore, the longitudinal direction of the sensor unit 12 is a direction intersecting the conveying direction of the first conveyance device 2 in the plan view, and more specifically, is a direction orthogonal to the conveying direction in the plan view.

Here, the sensor unit 12 is attached at a position between the two conveying rollers 11 in the plan view. More specifically, a part of the sensor unit 12 is disposed between the two conveying rollers 11. Currently, the longitudinal direction of the sensor unit 12 is the same direction as the longitudinal direction (an axial direction) of the conveying roller 11. In other words, the sensor unit 12 and the conveying roller 11 extend in parallel to each other.

Further, the sensor unit 12 is attached to a position below the conveyance surface of the first conveyance device 2. In other words, an upper end portion of the sensor unit 12 is located below the conveyance surface, and all of the plurality of sensor members 21 belonging to the sensor unit 12 are located below the conveyance surface.

In the conveyor device 1 of the present embodiment, as illustrated in FIG. 1 and the like, the sensor unit 12 is attached to a portion on the downstream side in the conveying direction of the first conveyance device 2, that is, a position closer to the downstream end than a center in the same direction.

The second conveyance device 3 is a transfer device (a conveying direction switching device) capable of changing the conveying direction, and in the present embodiment, a large number of small conveyance devices 30 having a small size are arranged in a planar shape.

In other words, the second conveyance device 3 includes a conveyance motor (not illustrated), a switching motor (not illustrated), and a plurality of small conveyance devices 30.

Each of the small conveyance devices 30 includes roller portions 31 (rotors) and a receiving member thereof, and the roller portions 31 are pivotally supported by the receiving member. Furthermore, the receiving member is turnable, and when the receiving member turns, the roller portions 31 turn including a rotation shaft together with the receiving member. The roller portions 31 serve as conveying rollers in the second conveyance device 3.

In the second conveyance device 3, when the switching motor is driven, the receiving members of the plurality of small conveyance devices 30 turn. In other words, the plurality of roller portions 31 turns together with the receiving member to change the posture, and directions of the respective roller portions 31 are simultaneously changed. In addition, when the conveyance motor is driven, the roller portions 31 of the plurality of small conveyance devices 30 rotate synchronously about the respective rotation shaft.

In other words, the conveying direction of the object is changed by the plurality of roller portions 31 turning together with the rotation shaft. Furthermore, the plurality of roller portions 31 rotates synchronously to energize and move the object on the second conveyance device 3. In other words, in the above-described "turn", the turning is performed about a turning shaft having a length in a direction intersecting the rotation shaft (the rotor rotation shaft) of the roller portions 31. Furthermore, the second conveyance device 3 can change the conveying direction in various directions in the horizontal direction by appropriately changing a turning angle.

Additionally, in the second conveyance device 3, a gear portion (gear teeth, not shown) is formed on an outer peripheral surface of the receiving member of each of the small conveyance devices 30 when a turning mechanism (a switching mechanism for changing the conveying direction) for turning the plurality of roller portions 31 is additionally described. Furthermore, in a housing of the second conveyance device 3, a large number of idle gears (not illustrated) are installed, and the idle gears are positioned between the respective gear portions of the two adjacent small conveyance devices 30. In other words, the gear portions of all the small conveyance devices 30 are engaged via the idle gears to form one gear train as a whole. Furthermore, when one of the gears is rotated by driving of the switching motor, the receiving members of all the small conveyance devices 30 turn (rotate) by a predetermined angle, and the directions thereof are simultaneously changed.

Next, various operations that can be executed by the conveyor device 1 of the present embodiment will be described in detail.

In an object detection operation executed by the conveyor device 1 (the sensor unit 12) of the present embodiment, it is possible to detect (check) a posture during conveying the object.

Figure 3A:
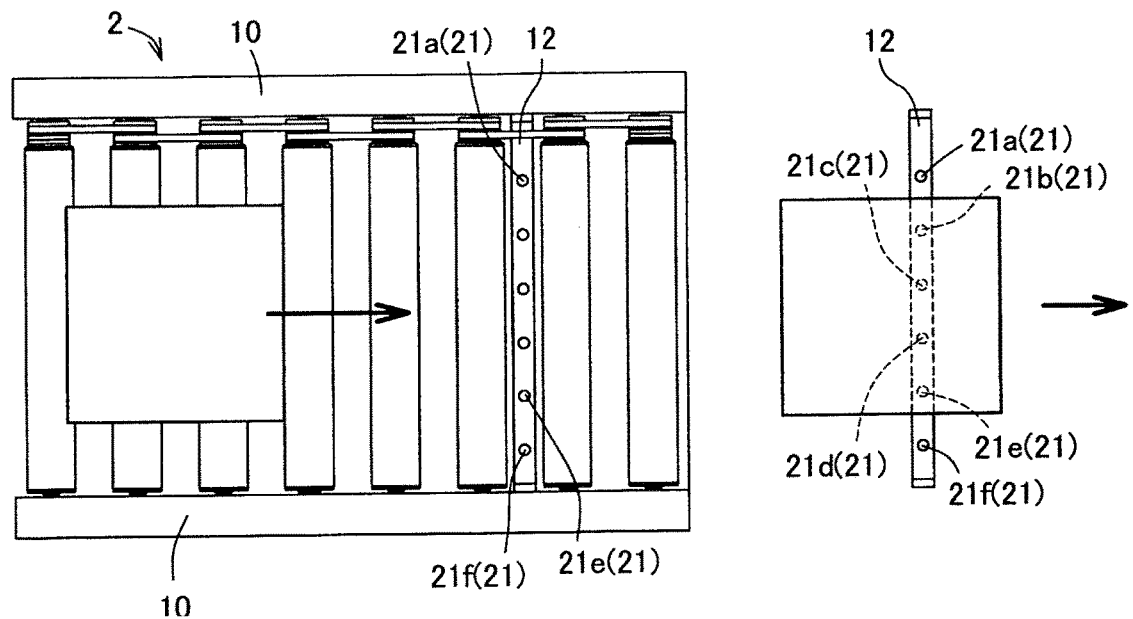

Specifically, as illustrated in FIG. 3A, in a case where the object is conveyed in a correct posture (an assumed posture), when the object is conveyed to an upper portion of the sensor unit 12, the presence of the object is detected by four sensor members 21b to 21e (see the right drawing). On the other hand, the presence of the object is not detected by the other two sensor members 21a and 21f.

In other words, the four sensor members 21 are turned on, and the two sensor members 21 remain off.

In other words, when a distal end portion of the object (being a right end in FIG. 3A, and hereinafter also simply referred to as a distal end portion) in the conveying direction reaches the upper portion of the sensor unit 12, the object is positioned above the sensor members 21b to 21e. Furthermore, until the object passes over the sensor unit 12, a state in which the object is positioned above the sensor members 21b to 21e is maintained. Meanwhile, during this period, the object is not positioned above the other two sensor members 21a and 21f.

Additionally, the "distal end portion in the conveying direction" referred to herein is a portion that becomes the downstream end in the conveying direction during conveyance. Similarly, a proximal end portion in the conveying direction (hereinafter also simply referred to as a proximal end portion) is a left end in FIG. 3A, and is a portion that becomes the upstream end in the conveying direction during conveyance. Therefore, a "period until the object passes over the sensor unit 12" is a period until the proximal end portion of the object is positioned on the downstream side in the conveying direction with respect to all the sensor members 21.

Therefore, until the object passes over the sensor unit 12, a state in which the four sensor members 21b, 21c, 21d, and 21e are turned on and the other two sensor members 21a and 21f are turned off is maintained.

Figure 3B:
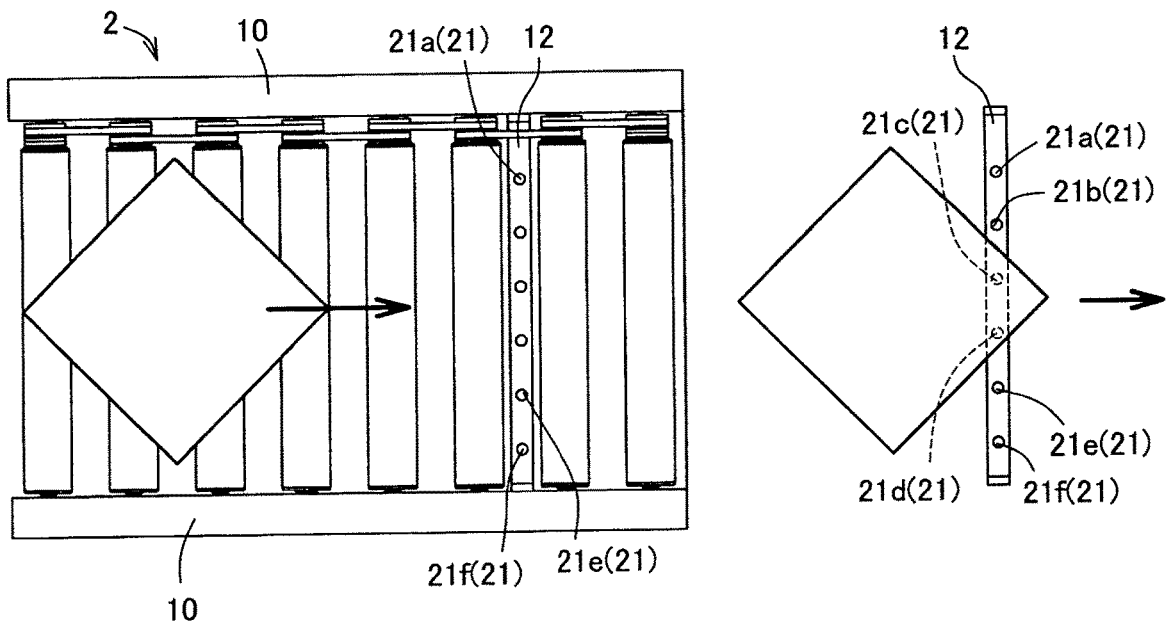

On the other hand, for example, as illustrated in FIG. 3B, in a case where the posture of the object becomes worse during conveyance (in a case where the posture is not assumed), first, the presence of the object is detected by the two sensor members 21c and 21d (see the right drawing). At this time, the other four sensor members 21a, 21b, 21e, and 21f do not detect the presence of the object. In other words, the two sensor members 21c and 21d are turned on, and the other four sensor members 21a, 21b, 21e, and 21f are turned off.

Thereafter, the four sensor members 21b, 21c, 21d, and 21f are turned on, and the other two sensor members 21a and 21f are turned off (not illustrated). Thereafter, all the sensor members 21 are turned on (not illustrated). Subsequently, similarly to the above, after a state in which the four sensor members 21b, 21c, 21d, and 21f are turned on, situation is shifted to a state in which the two sensor members 21c and 21d are turned on (not illustrated).

Here, until the object passes over the sensor unit 12, on/off combinations occur depending on which of the plurality of sensor members 21 are on and which are off at each time point. For example, when the number of sensor members 21 is 6 as described above, the number of combinations is 2 to the 6th power, which is 64.

Furthermore, until the object passes over the sensor unit 12, this combination may change to a different combination as time elapses. For example, in the above example, in a case where the object is conveyed in the correct posture (see FIG. 3A), the combination does not change as time elapses. In other words, the same four sensor members 21 remain on, and the same two sensor members 21 remain off.

On the other hand, in a case where the posture of the object is deteriorated (see FIG. 3B), as described above, the combination changes to a different combination as time elapses.

In other words, in the sensor unit 12 of the present embodiment, each of the plurality of sensor members 21 individually executes the detection operation until the object reaches and passes through the sensor unit 12. At this time, the detection result of each sensor member 21 is maintained in an ON state, maintained in an OFF state, or switched on and off once or a plurality of times. Furthermore, the control device can determine whether the object is conveyed in the correct posture based on the information on the combination of the plurality of detection results in this period. In addition, the control device can determine (check) the posture if the posture is not correct.

In other words, it is possible to detect the posture of the object based on information such as which sensor member 21 is turned on when the object approaches the sensor unit 12 and a state in which each sensor member 21 is turned on and off as time elapses. Furthermore, it is possible to detect the posture of the object based on a time difference in which each of the plurality of sensor members 21 is turned on.

Further, in the object detection operation executed by the conveyor device 1 (the sensor unit 12) of the present embodiment, it is possible to detect a conveyance position where the conveyance position of the object is detected (confirmed).

Figure 4A:
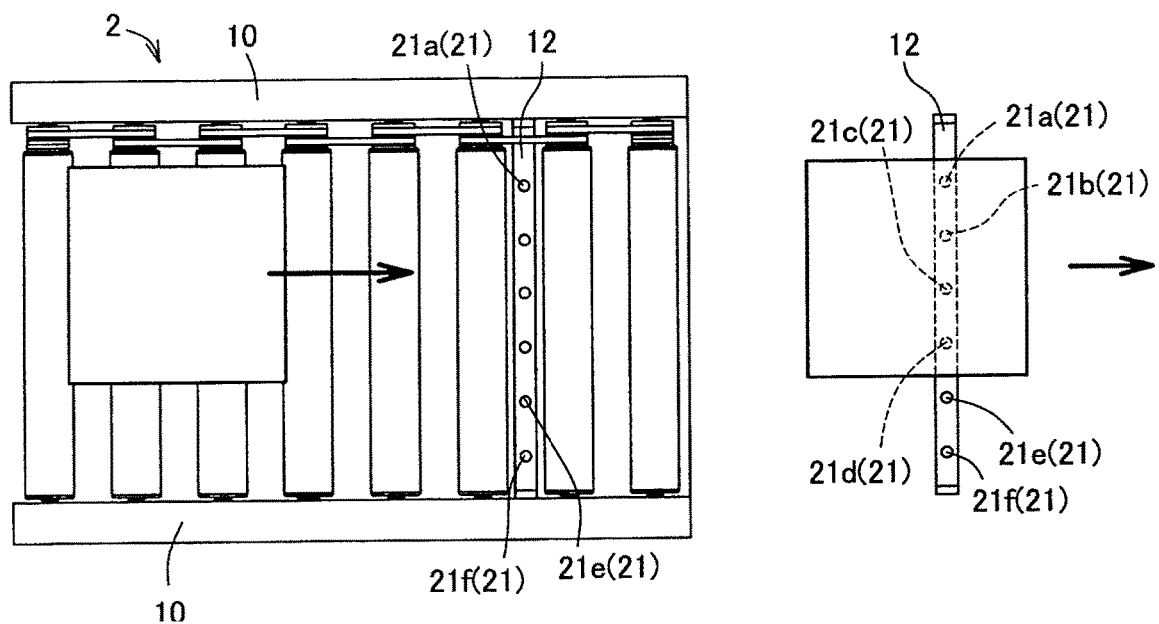

Specifically, as illustrated in FIG. 4A, in a case where the object is conveyed near the conveyor frame 10 on one side (the upper side in FIG. 4), when the object is conveyed to the upper portion of the sensor unit 12, the presence of the object is detected by the four sensor members 21a to 21d (see the right drawing). On the other hand, the presence of the object is not detected by the other two sensor members 21e and 21f.

In other words, the four sensor members 21 closer to one side in the longitudinal direction of the sensor unit 12 are turned on, and the other two sensor members 21 remain off.

Figure 4B:
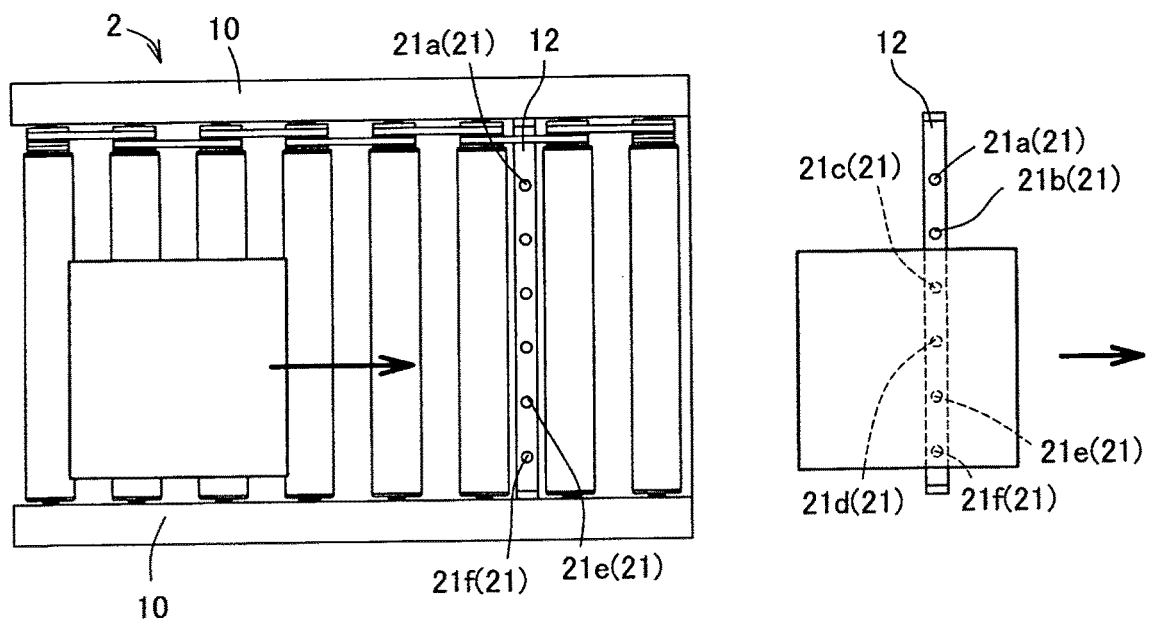

On the other hand, as illustrated in FIG. 4B, in a case where the object is conveyed near the conveyor frame 10 on the other side (a lower side in FIG. 4), when the object is conveyed to the upper portion of the sensor unit 12, the presence of the object is detected by the four sensor members 21c to 21f (see the right drawing). On the other hand, the presence of the object is not detected by the other two sensor members 21a and 21b.

In other words, the four sensor members 21 closer to the other side in the longitudinal direction of the sensor unit 12 are turned on, and the other two sensor members 21 remain off.

As described above, the sensor unit 12 of the present embodiment can detect the conveyance position of the object by determining which position of the sensor member 21 is turned on when the object approaches the sensor unit 12. In other words, it is possible to determine (confirm) at which position in the width direction of the first conveyance device 2 the object is conveyed. In other words, the conveyance position can be determined based on the information on the combination of the plurality of detection results when the object approaches the sensor unit 12.

Further, in the object detection operation executed by the conveyor device 1 (the sensor unit 12) of the present embodiment, it is possible to detect (confirm) the dimensions of the object.

More specifically, for example, in a case where the object is conveyed as shown in FIG. 3A, when the object is conveyed to the upper portion of the sensor unit 12, as described above, the four sensor members 21 are turned on, and the two sensor members 21 are turned off. Furthermore, a state in which the four sensor members 21 are turned on is maintained until the object passes over the sensor unit 12.

As a result, by acquiring time when the four sensor members 21 are turned on and time when the four sensor members are turned off, it is possible to acquire a time t (hereinafter, it is also simply referred to as a passing time t) from when the object reaches above the sensor unit 12 to when the object passes.

Furthermore, the control device calculates the conveyance distance of the object at the passing time t from the passing time t and the information on a rotation speed of the motor serving as the driving source of the first conveyance device 2. The conveyance distance is the same as the length of the object in the conveying direction, and the length of the object in the conveying direction can be acquired by acquiring the conveyance distance.

In other words, the length of the object in the conveying direction can be measured based on the time difference between the time when one or the plurality of sensor members 21 is first turned on and the time when one or the plurality of sensor members 21 is last turned on among the plurality of sensor members 21, and the information on the rotation speed of the motor serving as the driving source.

Further, in FIG. 3A, the four sensor members 21 are turned on. In other words, by determining how many sensor members 21 among the plurality of sensor members 21 are turned on, it is possible to acquire (measure) the length (an approximate length and approximate dimensions) of the object in the width direction (the width direction of the first conveyance device 2).

As described above, in the object detection operation executed by the conveyor device 1 (the sensor unit 12) of the present embodiment, the information regarding the posture of the object, the information regarding the conveyance position of the object, and the information regarding the dimensions of the object can be acquired as the information regarding the object.

A plurality of pieces of this information can be acquired at the same time, and for example, the information regarding the posture of the object, information regarding the conveyance position of the object, and the information regarding the dimensions of the object may be acquired at the same time. In other words, one or more pieces of information selected from these pieces of information may be acquired.

Here, in a case where the object is conveyed in a tilted posture (a posture different from the assumed posture), the information on the posture of the object and the information on the length (dimensions) of the object in the tilted posture in the conveying direction may be acquired. Furthermore, from these pieces of information, the length (dimensions) in the conveying direction in a case where the conveyance is performed in the correct posture may be acquired.

More specifically, as described above, by acquiring the information on the posture of the object, it is possible to determine how much the object is inclined from the assumed correct posture in a case where the object is conveyed in a posture different from the assumed posture. In other words, it is possible to acquire a degree of inclination (an inclination angle) in the plan view. The length (dimensions) in the conveying direction in a case where the object is conveyed in the correct posture can be calculated from such information and the information on the length (dimension) in the conveying direction of the object in the inclined posture.

Furthermore, as described above, the second conveyance device 3 is a transfer device capable of changing the conveying direction in various directions. Therefore, after the object is introduced into the second conveyance device 3, the object is moved so as to be largely swung on the entire conveyance surface of the second conveyance device 3, or is moved while finely changing the conveying direction, whereby the posture of the object can be changed, and the conveyance position can be changed.

As a result of the above-described detection operation, in a case where it is determined that the posture of the object is different from the assumed posture, the second conveyance device 3 may be ordered to execute an operation (a posture change operation) of changing the posture of the object to set the posture of the object to a prescribed posture.

Similarly, in a case where it is determined that the conveyance position of the object is different from the prescribed position as a result of the above-described detection operation, the second conveyance device 3 may be ordered to execute an operation of changing the conveyance position of the object (a conveyance position changing operation) to set the conveyance position of the object as the prescribed position.

Figure 5:
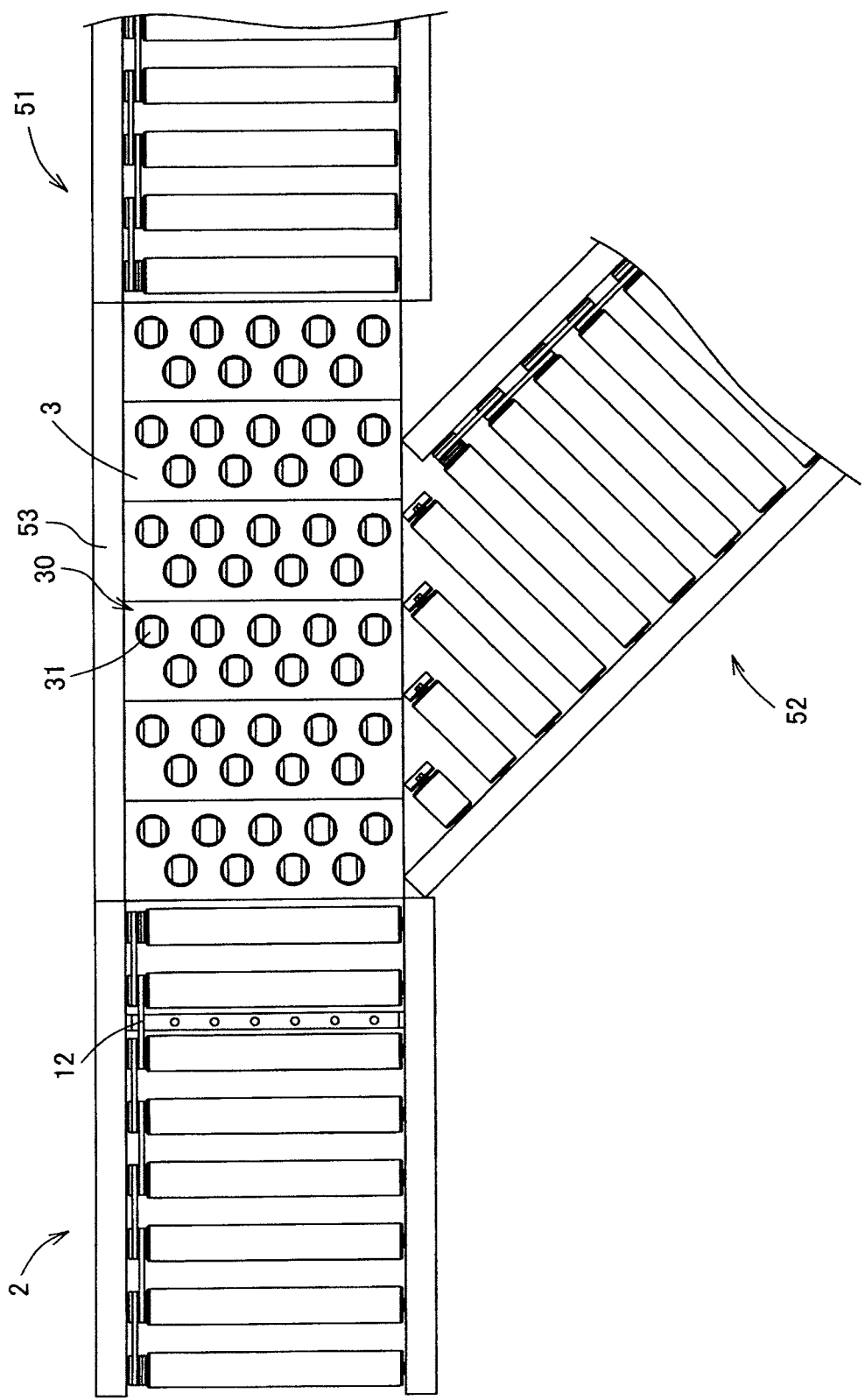
FIG. 5 is an explanatory view showing a branch conveyor device formed including the conveyor device of FIG. 1.

Here, as illustrated in FIG. 5, the conveyor device 1 is usually used by providing a conveyance path on the downstream side of the second conveyance device 3. As described above, when the posture of the object is changed (corrected) or the conveyance position of the object is changed (corrected) by the second conveyance device 3, it is possible to suppress (prevent) an occurrence of problems caused by poor posture of the object, displacement of the conveyance position, and the like on the downstream side of the second conveyance device 3. For example, in a case where an operation of reading information from a barcode of an object to be conveyed is performed on the downstream side of the second conveyance device 3, or in a case where an operation of attaching a label to an object to be conveyed is performed, these operations can be suitably executed. In other words, it is possible to prevent the occurrence of problems such as the object being conveyed in a posture in which these operations cannot be performed (difficult).

In the example of FIG. 5, a main conveyance device 51 and a sub conveyance device 52 are provided on the downstream side of the second conveyance device 3, which is a so-called branch conveyor device. Additionally, in the present embodiment, both the main conveyance device 51 and the sub conveyance device 52 are conveyor devices, and specifically, are roller conveyors. However, the main conveyance device 51 and the sub conveyance device 52 may be a transfer device instead of a conveyor device.

The main conveyance device 51 forms a part of a main conveyance path including the first conveyance device 2, the second conveyance device 3, and the main conveyance device 51. In other words, a part of the conveyance path assumed to linearly convey the object is formed.

The sub conveyance device 52 forms a part of a sub conveyance path branching and extending from the main conveyance path. In other words, the first conveyance device 2, the second conveyance device 3, and the sub conveyance device 52 form a part of the conveyance path. In this conveyance path, it is assumed that the object is conveyed so as to draw a trajectory partially extending while bending.

Additionally, of the sides of the second conveyance device 3, a frame member 53 is disposed on a side opposite to the sub conveyance device 52.

In such a branch conveyor, as described above, even in a case where the posture and the conveyance position of the object conveyed by the first conveyance device 2 are not preferable, correction can be performed by the second conveyance device 3. Therefore, even in a case where the object is conveyed from the second conveyance device 3 to either the main conveyance device 51 or the sub conveyance device 52, appropriate conveyance can be performed.

For example, in a case where the object is conveyed to the sub conveyance device 52, the object can be introduced into the sub conveyance device 52 from an appropriate position by changing (correcting) the posture and the conveyance position of the object. In other words, since a substantial branching angle when the object is conveyed toward a sub conveying passage can be set to a preferable angle, occurrence of clogging or the like at the branching portion can be suppressed.

The substantial branching angle may be changed depending on (based on) the detected conveyance position of the object in the first conveyance device 2.

In addition, the above-described posture changing operation may be an operation of changing the posture of the object by pressing the object against the frame member 53. In other words, the extension member (the frame member 53) extending in a predetermined direction may be provided on the upper side of the conveyance surface of the conveyance device, and the object may be conveyed toward the extension member and pressed to change the posture of the object.

In the above-described conveyor device, in addition to providing the branching portion (see FIG. 5) as described above, a merging portion where two or more conveyance paths on the upstream side merge may be provided. In this case, the above-described sensor unit 12 may be disposed on the upstream side of the merging portion.

Figure 6:
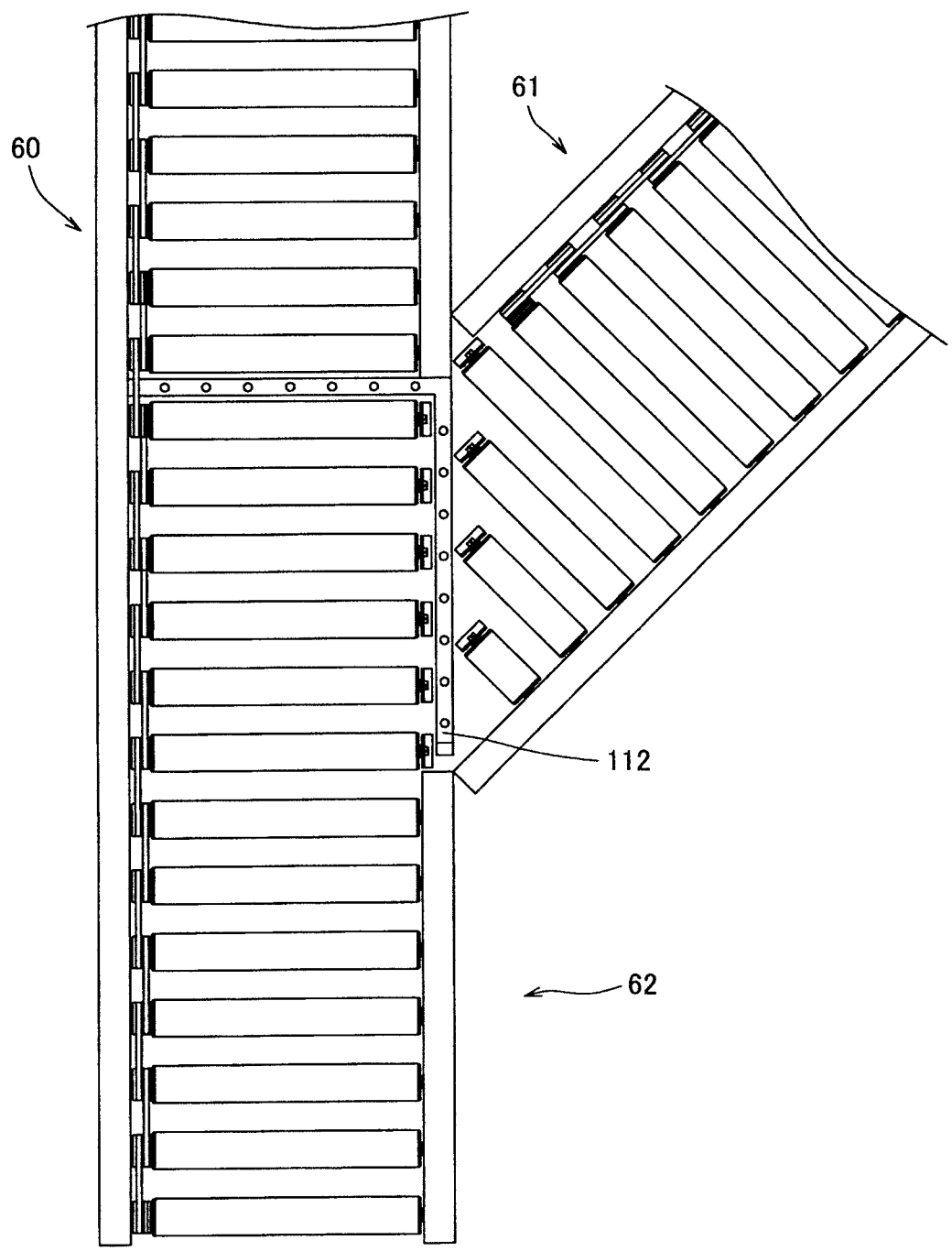
FIG. 6 is an explanatory view illustrating a conveyor device different from the conveyor device in FIG. 1.

In addition, although the above-described sensor unit 12 has a shape that extends linearly as a whole, the present invention is not limited thereto. For example, as illustrated in FIG. 6, a sensor unit 112 may have a shape in which a part is bent and extended. Furthermore, the sensor unit 112 may be disposed at a boundary between the two conveyance devices 60 and 61 on the upstream side and a conveyance device 62 at the merging portion. The sensor unit 112 has two linearly extending portions and a bent portion which is a bent and extending portion. Furthermore, one linearly extending portion is disposed at a boundary portion between the one upstream conveyance device 60 and the downstream conveyance device 62, and the other linearly extending portion is disposed at a boundary portion between the other upstream conveyance device 61 and the downstream conveyance device 62.

Additionally, instead of the sensor unit 12, a sensor unit having a shape entirely extending in a bow shape in the plan view may be attached. In this case, a part of the sensor unit may be disposed at a portion that becomes a boundary between one of the conveyance devices 60 on the upstream side and the conveyance device 62 on the downstream side, and another part may be disposed at a portion that becomes a boundary between the other conveyance device 61 on the upstream side and the conveyance device 62 on the downstream side.

In other words, the sensor unit (the extension portion of the sensor unit) may extend linearly as a whole, or may have a shape having one or more linear extension portions and at least a part extending while being bent or curved. Further, the shape is not limited to a shape having a linearly extending portion, and may be a shape in which the entire portion extends while being curved (an arcuate shape extending in a bow shape). As described above, the sensor unit may have a portion extending linearly or curvedly in at least a part thereof.

Figure 7A:
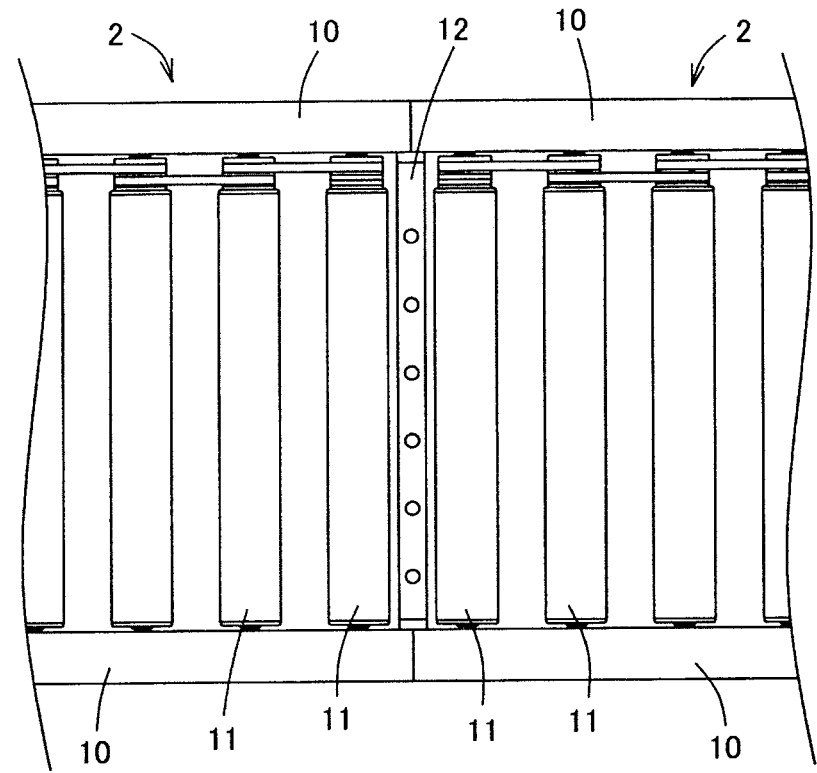
FIG. 7A is an explanatory view illustrating a conveyor device different from those conveyor devices in FIG. 1 and FIG. 6.

In the above-described conveyor device, when a conveyance path for linearly conveying an object is formed, a plurality of first conveyance devices 2 may be arranged side by side along the conveying direction as illustrated in FIG. 7A. At this time, the sensor unit 12 may be attached at a position that is a boundary between the two first conveyance devices 2.

In other words, one longitudinal end of the sensor unit 12 may be fixed to the two conveyor frames 10. Specifically, in the conveyor device, one end of the sensor unit 12 may be fixed so as to straddle a conveyor frame 10 (at one side in the width direction) of the first conveyance device 2 on the upstream side and a conveyor frame 10 of the first conveyance device 2 on the downstream side. Similarly, the other end of the sensor unit 12 may be fixed to two conveyor frames 10 arranged in parallel in the conveying direction, and may be fixed to both of the two conveyor frames 10 belonging to different first conveyance devices 2.

At this time, as illustrated in FIG. 7A, at least a part of the sensor unit 12 is disposed between the conveying roller 11 located on the most downstream side in the first conveyance device 2 on the upstream side and the conveying roller 11 located on the most upstream side in the first conveyance device 2 on the downstream side.

Figure 7B:
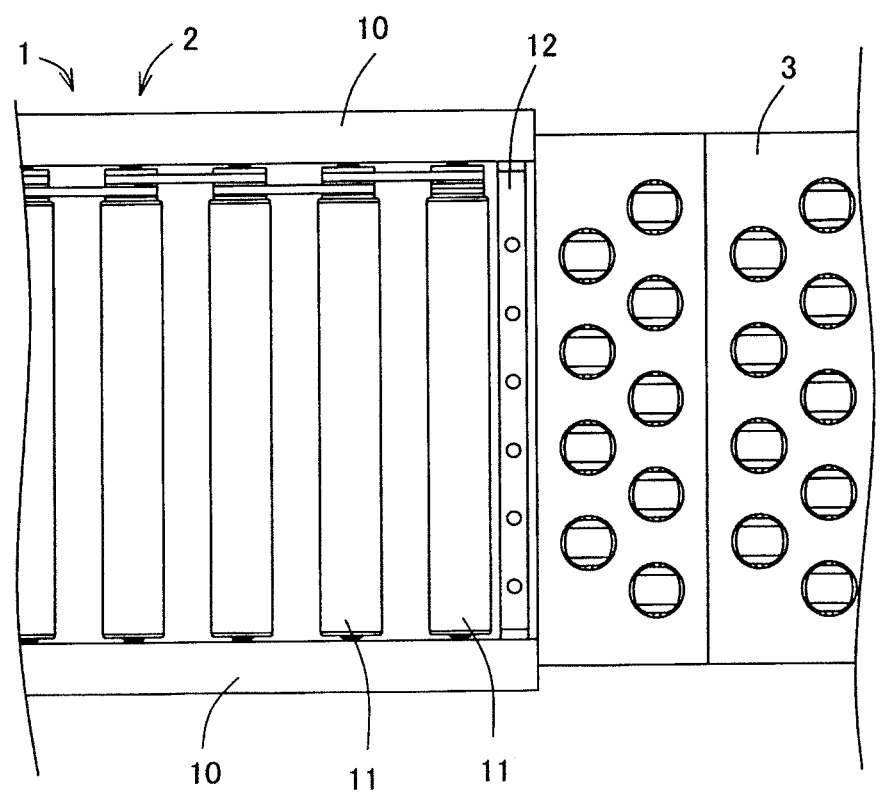
FIG. 7B is an explanatory view illustrating a state in which a sensor unit is attached to a position different from the sensor unit in FIG. 1 in the conveyor device in FIG. 1.

In addition, as illustrated in FIG. 7B, the sensor unit 12 may be provided at or near a position that is a boundary between the first conveyance device 2 and the second conveyance device 3. In FIG. 7B, the sensor unit 12 is fixed to the pair of conveyor frames 10 of the first conveyance device 2. In other words, the sensor unit 12 is disposed at a position adjacent to the upstream side of the boundary. At this time, the sensor unit 12 is disposed at a position on the downstream side of the conveying roller 11 located on the most downstream side in the first conveyance device 2, and a part thereof is located on the side of the conveying roller 11.

Here, when the object is conveyed, the conveyance of the object may be temporarily stopped on the conveyance device on the upstream side, the object may be temporarily held on the conveyance device, and then the object may be conveyed from the conveyance device to the conveyance device on the downstream side.

In such a case, when the sensor unit 12 is provided at or near the boundary portion between the two conveyance devices as described above, a protrusion of the object can be detected. In other words, when the conveyance of the object is temporarily stopped on the conveyance device on the upstream side, it is possible to determine whether or not a part of the object is positioned on the conveyance device on the downstream side.

In the above-described embodiment, an example in which one sensor unit 12 is attached to one conveyance device (the first conveyance device 2) has been described, but the present invention is not limited thereto. A plurality of sensor units 12 may be attached to one conveyance device (the first conveyance device 2). In addition, the sensor unit 12 may be attached to a plurality of conveyance devices among the conveyance devices belonging to the conveyor device 1.

In the above-described embodiment, an example has been described in which both end portions of the sensor unit 12 in the longitudinal direction are fixed to each of the two conveyor frames 10, and the sensor unit 12 is attached. However, the present invention is not limited thereto, and for example, the sensor unit 12 may be attached to one conveyor frame 10 in a cantilever manner. However, from a viewpoint of stabilizing the posture of the attached sensor unit 12, both ends are preferably fixed.

In the above-described embodiment, the transfer device capable of changing the conveying direction in many directions is adopted as the second conveyance device 3, but instead, a transfer device that conveys the object in one of two directions may be adopted. In other words, a known transfer device (not illustrated) that conveys the object to one of the direction in which the object is directly moved straight and to one of the lateral directions may be adopted.

An example in which the sensor unit 12 of the above-described embodiment employs the reflective photoelectric sensor as the sensor member 21 has been described, but the present invention is not limited thereto. The sensor member employed in the sensor unit only needs to be able to detect the presence or absence of an object in a predetermined place, and may be another sensor.

In the above-described embodiment, the entire portion is a linear extension portion (an extension portion), but the present invention is not limited thereto. For example, a flange-shaped mounting portion may be provided at both end portions in the longitudinal direction, and the extension portion may be positioned between the two mounting portions. In other words, at least a part of the entire sensor unit may be an extension portion.

Figure 1B:
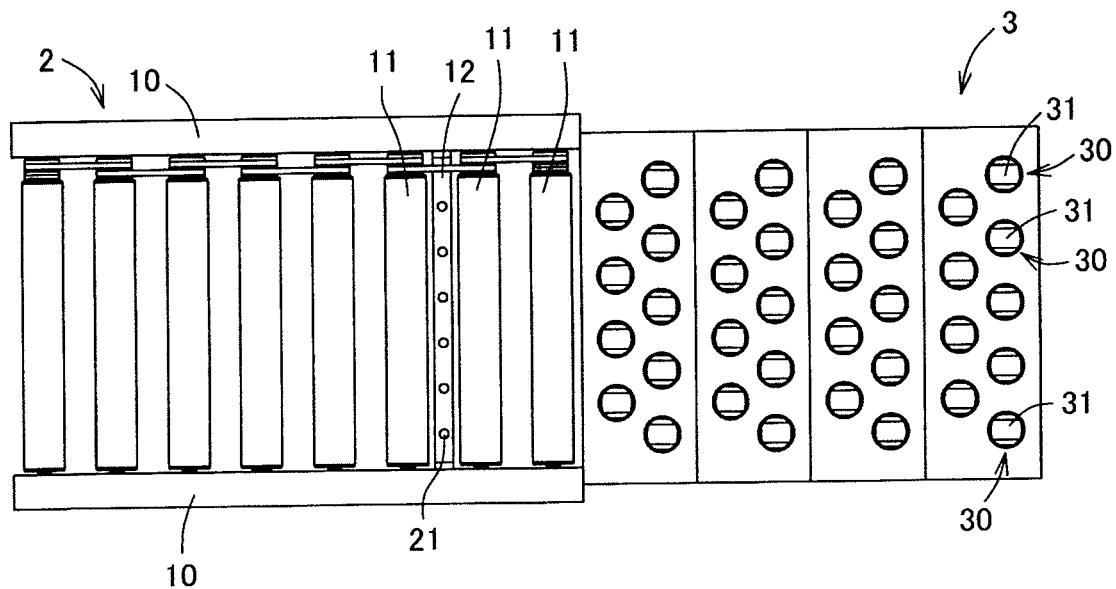

Additionally, in the above-described embodiment, as illustrated in FIG. 1B and the like, an example in which each of the plurality of sensor members 21 is arranged at a center of (or close to) the sensor unit 12 in the width direction has been described. Furthermore, an example in which the plurality of sensor members 21 is linearly arranged in the plan view is shown. However, the present invention is not limited thereto. Additionally, "the width direction of the sensor unit 12" is a direction orthogonal to the longitudinal direction of the sensor unit 12 in the plan view, and is a left-right direction (the conveying direction of the first conveyance device 2) in FIG. 1B.

For example, in the sensor unit 12 described above, one or more sensor members 21 may be arranged at positions shifted in the width direction of the sensor unit 12. In other words, the plurality of sensor members 21 may be arranged in a predetermined direction (the longitudinal direction of the extension portion of the sensor unit 12) as a whole, and may be arranged at positions separated from each other in the predetermined direction.

EXPLANATION OF REFERENCE NUMBERS

1: conveyor device
2: first conveyance device
11: conveying roller (driving body)
12: sensor unit (conveyor sensor)
21: sensor member

The invention claimed is:

1. A conveyor device that conveys an object to a predetermined conveyance place, comprising a conveyor sensor that detects information of the object,
    the conveyor sensor including a plurality of sensor members each capable of individually detecting presence of the object,
    wherein the plurality of sensor members each has a light projecting unit and a light receiving unit,
    each of the light projecting unit tin light,
    each light receiving unit configured to receive light projected from one of the light projecting units that is reflected by the object, thereby detecting presence of the object at a predetermined place, and
    wherein the plurality of sensor members are lined up in a direction intersecting a conveying direction of the object.

2. The conveyor device according to claim 1, further comprising a first conveyance device that forms at least a part of a conveyance path of the object,
    wherein the first conveyance device places the object on a conveyance surface to convey the object, and
    wherein the conveyor sensor is attached below the conveyance surface of the first conveyance device.

3. The conveyor device according to claim 1, further comprising a first conveyance device that forms at least a part of a conveyance path of the object,
    wherein the first conveyance device includes a plurality of driving bodies arranged at an interval, the plurality of driving bodies placing the object on a conveyance surface over the driving bodies to convey the object,
    wherein the driving bodies includes a first and a second driving bodies, the first and the second driving bodies being adjacent to each other, and
    wherein the plurality of sensor members of the conveyor sensor are lined up between the first driving body and the second driving body.

4. The conveyor device according to claim 1,
    wherein the conveyor sensor executes a first detection operation of detecting one or more pieces of information selected from the group consisting of information on a posture of the object during conveyance and information on a conveyance position, and
    wherein one or more selected from the group consisting of a posture during conveyance and a conveying position are changed based on a result of the first detection operation.

5. The conveyor device according to claim 1, wherein the conveyor sensor executes a second detection operation of detecting information on dimensions of the object.

6. The conveyor device according to claim 4,
wherein an extension member is provided above a side of the conveyance surface, and
wherein when changing the posture of the object during conveyance, the object is conveyed toward the extension member, and the posture of the object is changed by pressing the object against the extension member.

7. A conveyor sensor that is attached to a conveyor device conveying an object to a predetermined conveyance place and that detects information of the object, comprising:
a plurality of sensor members each capable of individually detecting presence of the object; and
an outer member extending substantially linearly,
wherein the plurality of sensor members each has a light projecting unit and a light receiving unit,
each of the light projecting units projecting light,
each light receiving unit configured to receive light projected from one of the light projecting units that is reflected by the object, thereby detecting presence of the object at a predetermined place, and
wherein the plurality of sensor members are arranged on the outer member and are lined up in a longitudinal direction of the outer member.

8. The conveyor device according to claim 2,
wherein the first conveyance device includes a plurality of driving bodies arranged at an interval, the plurality of driving bodies placing the object on a conveyance surface over the driving bodies to convey the object,
wherein the driving bodies includes a first and a second driving bodies, the first and the second driving bodies being adjacent to each other, and
wherein the plurality of sensor members of the conveyor sensor are lined up between the first driving body and the second driving body.

* * * * *